United States Patent [19]
Tomita et al.

[11] 3,851,562
[45] Dec. 3, 1974

[54] TOOL MOUNTING DEVICE FOR A MACHINE TOOL

[75] Inventors: Tamaki Tomita; Yoshiki Ochiai, both of Okazaki, Japan

[73] Assignee: Toyoda Koki Kabushiki Kaisha, Kariya-shi, Aichi-ken, Japan

[22] Filed: Mar. 1, 1973

[21] Appl. No.: 337,178

[30] Foreign Application Priority Data
Mar. 6, 1972   Japan.............................. 47-23022

[52] U.S. Cl..................... 20/11 A, 29/26 A, 29/568, 279/1 TS, 279/103
[51] Int. Cl............................................ B23b 31/10
[58] Field of Search .......... 90/11 A, 11 D; 279/1 A, 279/1 TS, 103, 89, 90; 29/568, 26 A

[56] References Cited
UNITED STATES PATENTS

| | | | |
|---|---|---|---|
| 3,526,033 | 9/1970 | Saunders............................... | 29/568 |
| 3,586,343 | 6/1971 | Reed..................................... | 279/1 A |
| 3,603,203 | 9/1971 | Rhodes................................. | 90/11 A |
| 3,791,022 | 2/1974 | Kurimoto et al..................... | 29/568 |

*Primary Examiner*—Andrew R. Juhasz
*Assistant Examiner*—Z. R. Bilinsky
*Attorney, Agent, or Firm*—Oblon, Fisher, Spivak, McClelland & Maier

[57] ABSTRACT

A tool mounting device wherein a key engagement between a key on a spindle and a tool holder is established without first orientating the spindle and the tool holder is described.

A fixed key and a positioning pin are provided on the spindle, the fixed key being fixedly mounted and used for transmitting the driving force to the tool holder and the positioning pin being slidably mounted and used for orientating the tool holder with respect to the spindle. While the spindle is rotated at a constant low speed, the tool holder is inserted into the spindle, and the inserting movement of the tool holder is temporarily stopped when a flange portion thereof engages a forward end of the positioning pin. Thereafter, when engagement between an inner abutment surface of an arcuate recess in the rear end of the flange of the tool holder and the positioning pin is confirmed by a pressure switch, the tool holder is further inserted into the spindle so as to establish the key engagement between the fixed key and the tool holder and to mount the same therewithin in a locked state.

6 Claims, 4 Drawing Figures

TOOL MOUNTING DEVICE FOR A MACHINE TOOL

BACKGROUND OF THE INVENTION

1. Field of the Invention

The present invention relates generally to tool mounting devices, and more particularly to an improved device for establishing engagement between a fixed key on a spindle and a key-way of a tool holder without first orientating the spindle and the tool holder.

2. Description of the Prior Art

In a machine tool having an automatic tool changing apparatus, one of two key-ways on a tool holder must be engaged with a fixed key complementary thereto on a rotary spindle of the machine tool so as to transmit the rotational torque of the spindle to the tool holder.

In such machine tools, it has heretofore been necessary to stop the spindle at a required angular position thereof and to keep the tool holder in a predetermined orientation so that the fixed key on the spindle may be aligned and engaged with one or the other key-way of the tool holder which is transferred toward the spindle by a transfer device. Therefore, a device which is operative to mechanically index the spindle is required in such machine tools, and in addition much cumbersome labor must be exerted to insure that each key-way of the tool holder is pertinently orientated in a tool magazine.

Furthermore, if the tool holder rotates even a small amount in the transfer device during the transferring movement thereby, the key-way of the tool holder is no longer able to engage the fixed key on the spindle. It is therefore desirably required that the transfer device is capable of maintaining the predetermined orientation of the tool holder therein.

Moreover, as the key is not always engaged with the same keyway of the tool holder, uniform engagement of the shank portion of the tool holder with the socket portion of the spindle is not obtained. That is, since the shank portion and the socket portion themselves generally have a certain degree of error of finishing, the engagement relationship therebetween is slightly changed in accordance with the engaging condition between the key and key-way. Consequently, the finished workpieces are slightly different in size in accordance with the non-uniformity of the engagement between the tool holder and the spindle even when the same tool is employed to perform the same machining operation on the various different workpieces.

SUMMARY OF THE INVENTION

Accordingly, it is an object of the present invention to provide a new and improved tool mounting device for a machine tool.

Another object of the present invention is to provide a tool mounting device which is readily and correctly capable of mounting a tool holder into a spindle without indexing the spindle to a desired angular position therefor.

Still another object of the present invention is to provide a tool mounting device in which a key-way of a tool holder is quickly and positively engaged with a fixed key on a spindle even though the tool holder is located in a random angular position when it is inserted into the spindle.

Still a further object of the present invention is to provide a tool mounting device wherein a positioning pin in a spindle is engaged with an abutment surface of a tool holder so that a key-way of the tool holder is orientated in alignment with a fixed key on a spindle in a predetermined angular position.

Yet a further object of the present invention is to provide a tool mounting device wherein uniform engagement bewteen the tapered shank of a tool holder and a tapered socket of the spindle is obtained, for performing machining operations with a high degree of accuracy.

The foregoing and other objects are attained through the provision of a tool mounting device which according to the present invention features a fixed key and a positioning pin provided on a spindle, the positioning pin being arranged at a position more protruded and larger in width than the fixed key so as to orient the tool holder in respect to the spindle. When a tool holder is inserted into the spindle while being rotated at a constant low speed, the positioning pin is urgingly engaged with a flange portion of the tool holder and thereafter engaged with an abutment surface thereof during a transient stoppage of the inserting movement of the tool holder. Thus, the key alignment of the tool holder and the spindle is established by confirming the engagement between the abutment surface and the positioning pin by a pressure switch, thereby permitting positive mounting of the tool holder within the spindle.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several views and in which.

DETAILED DESCRIPTION OF THE PREFERRED EMBODIMENT

Figure 1:
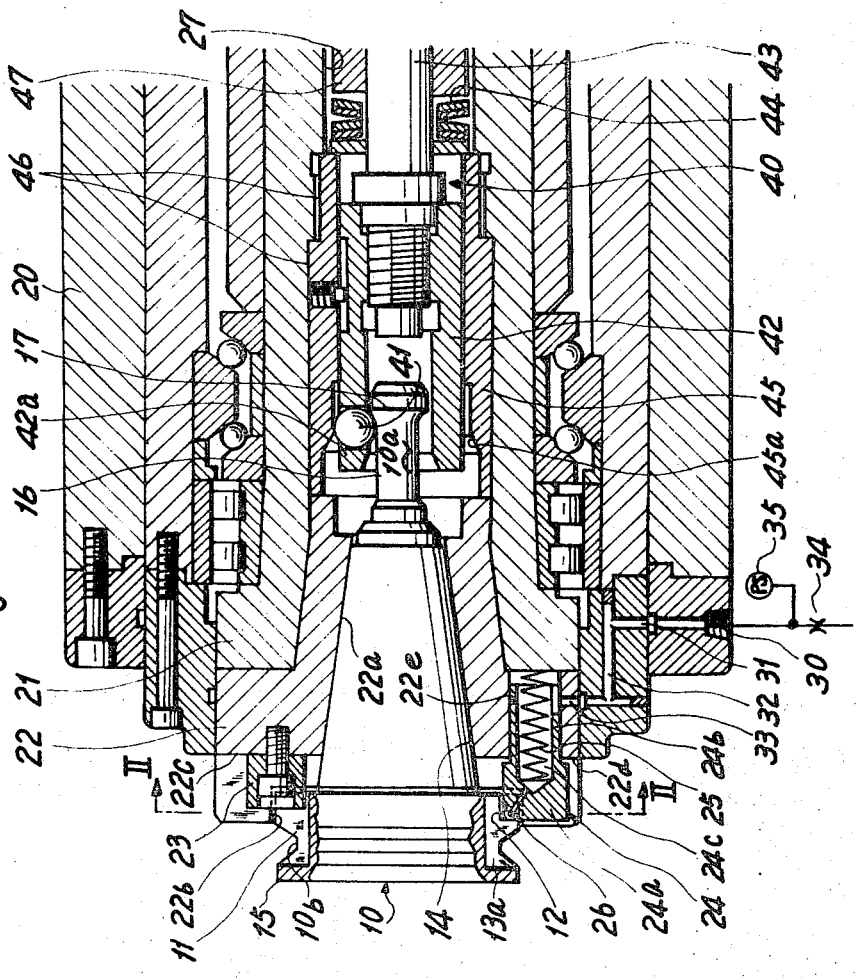
FIG. 1 is a cross-sectional view showing a preferred embodiment of a tool mounting device according to the present invention.

Referring now to the drawings, and more particularly to FIG. 1 thereof, the reference numeral 10 generally designates a tool holder to which a conventional cutting tool is mountedly connected in the usual manner. The tool holder 10 is provided with a lock plug 10a which is formed with a peripheral groove 16 so as to provide a shoulder 17 for engagement with a binding or locking device generally indicated by the reference numeral 40 which will be described hereinafter. A key-way 11 and a groove 13 having an abutment surface 13a are provided on the tool holder 10 being diametrically opposed to each other on a flange portion 15 of the tool holder on which an annular V-groove 10b is formed. An arcuate recess 12 is circumferentially extended from the groove 13 through a predetermined appropriate distance on the flange portion 15.

A tool spindle 21 is rotatably mounted on a spindle head 20 through anti-friction bearings and is driven by a suitable driving mechanism in order to perform machining operations. An adapter 22 is fixedly mounted on the left hand end, or on the front end, of the tool spindle 21. The adapter 22 is provided with an axial tapered socket 22a which is complementary to a tapered shank 14 of the tool holder 10 so as to receive the same therein, the left or front end of the socket communicating with an enlarged opening bore 22b. The enlarged opening bore 22b is larger in diameter than the entrance of the tapered socket 22a in the adapter 22. Usual slots 22c and 22d are provided on the front end portion of the adapter 22 at diametrically opposite positions, and one of the slots thereof being slot 22c in this case, is narrower in width than the other slot 22d.

In the slot 22c of the adapter, a fixed driving key 23 is fixedly mounted to be snugly engaged with the keyway 11. On the other end, slidably mounted within the slot 22d is a positioning pin generally indicated by the reference numeral 24 having a square head portion 24a which is wider than the fixed driving key 23 and is refrained from being rotatably moved. An inner cylindrical portion 24b of the positioning pin 24 is slidably received within a cylindrical bore 22e provided in the adapter 22. A spring 25 is interposed in a compressed condition between an interior chamber 24c formed in the cylindrical portion 24b of the positioning pin 24 and the left side or frontal surface of the tool spindle 21 to resiliently urge the positioning pin 24 toward the left, as seen in FIG. 1.

In the square head portion 24a, there is provided a nozzle 26. The one end of the nozzel 26 is directed to the flat face of the square head portion 24a, which is to be engaged with the abutment surface 13a. The other end of the nozzle 26 is introduced into the interior chamber 24c of the positioning pin 24. The interior chamber 24c is communicated with an inlet port 30 through passages 31, 32 and 33, the inlet port 30 being connected to a suitable pneumatic pressure source not shown, through a control valve or a fixed throttle valve 34. Also, a pressure switch 35 is operably arranged between the inlet port 30 and the throttle valve 34. Therefore, when the positioning pin 24 is contacted with the abutment surface 13a, the nozzle 26 is simultaneously shut off to thereby increase the pressure in the interior chamber 24c. Thus, the pressure switch 35 operates as a confirmation of the engagement situation between the pin 24 and the abutment surface 13a.

Figure 2:
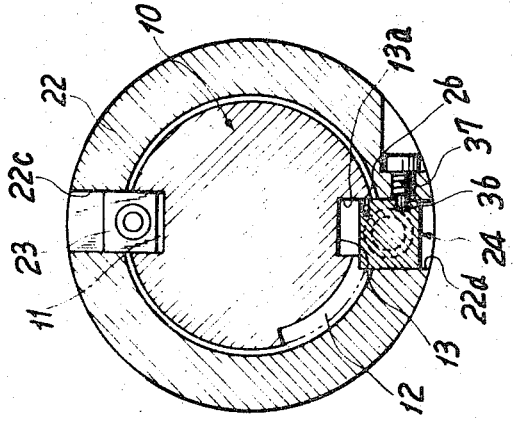
FIG. 2 is a cross-sectional view taken along the line II—II in FIG. 1.

Furthermore, as shown in FIG. 2, on the square head portion 24a, a slide way 36 is formed, in which a stop pin 37 is snugly carried for restricting the projected position of the positioning pin 24 being biased toward the left, as seen in FIG. 1, by the urging force of the spring 25. The front or left end of the positioning pin 24 protrudes by a predetermined amount from the left or front end of the adapter 22 further than the left end of the fixed key 23. That is, the flange portion 15 of the tool holder 10 is held in the engagement of the abutment surface 13a thereof with the square head portion 24a so as to orientate the same with respect to the spindle when the tapered shank 14 of the tool holder 10 is inserted into the tapered socket 22a.

Passing within the spindle 21 in axial alignment therewith is a penetrating hole or bore 27 in which the binding or locking device 40 is provided for positively clamping the tapered shank 14 into the tapered socket 22a. An enlarged bore 46 in the spindle 21 adjoins the left or forward end of the penetrating hole 27 and a cylindrical member 45 is fixedly mounted therein.

The locking device 40 comprises a sleeve 42 axially movable in the cylindrical member 45, which sleeve is adapted to receive the right hand end of the lock plug 10a therein. The sleeve 42 has a plurality of openings 42a lying within a transverse plane through the axis of the sleeve 42 and being equally spaced from one another in a circumferential direction thereof. Each of the openings 42a contains a steel ball 41, the diameter of which is slightly greater than the thickness of the sleeve 42 so that the balls 41 may project from one end or the other end of the openings 42a. The inner edges of the openings 42a are penned over, or in other words, are restricted to prevent the balls from dropping through the openings 42a into the sleeve 42. The sleeve 42 is attached to the left end of a longitudinally movable actuating rod 43 which is threaded thereinto.

The movable actuating rod 43 has a reciprocating member 47 attached thereon and a relatively heavy disc spring 44 is disposed together with a circular plate between the cylindrical member 45 and the reciprocating member 47 so that the actuating rod 43 is normally urged toward the right for biasing the sleeve 42 into a locking position, as shown in FIG. 1. On the account of this relation, the disk spring 44 exerts a force necessary to maintain the tool holder 10 secured in the tapered socket 22a under an operating condition.

Thus, the tool holder 10 is admitted into the adapter 22, or the tapered shank 14 thereof is inserted into the tapered socket 22a by a conventional tool transfer device, not shown, which has a pair of grasping claws engageable with the V-groove 10b of the flange portion 15. The tool transfer device serves to simultaneously exchange tool holders 10 positively mounted within a tool storing magazine, not shown, and within the tool spindle 21, respectively, by an axial and rotatable movement thereof. In the operation of inserting the tool holder into the tapered socket 22a by means of the tool transfer device, the inserting movement of the tool holder 10 should be preferably halted in an appropriate position before the flange portion 15 thereof engages the fixed key 23 on the adapter 22, or the inserting movement of the tool holder 10 should be reduced in speed so that the tool holder 10 can be orientated with respect to the spindle through the engagement of the abutment surface 13a and the positioning pin 24.

Next, the tool mounting device according to the present invention will now be described in detail.

First of all, when the tool holder 10 has to be withdrawn from the tool spindle 21, the grasping claws of the tool transfer device are engaged with the V-groove 10b of the tool holder 10. In this situation, the spindle 21 is rotated at a constant low speed, thereby permitting the grasping claws to slip in the V-groove 10b. Thereafter, the locking device 40 is released or the sleeve 42 and the actuating rod 43 are slidably moved toward the left from the position shown in FIG. 1 by a hydraulic cylinder mechanism, not shown. The balls 41 may therefore be readily moved to protrude outwardly of the sleeve 42 into a larger bore of the cylindrical member 45 at the left or forward end thereof. That is, the balls 41 are no longer urged toward the peripheral groove 16 by the smaller bore of cylindrical member 45, thereby allowing the plug 10a to be freely moved out of the sleeve 42.

Figure 3:
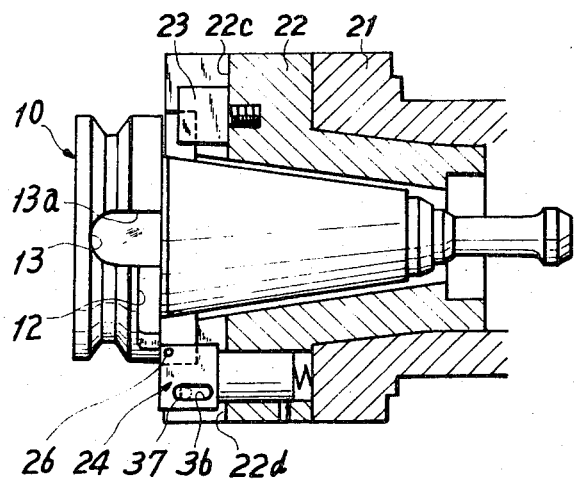
FIGS. 3 and 4 are explanatory views showing the operation for inserting a tool holder into a spindle with the apparatus of this invention.
Figure 4:
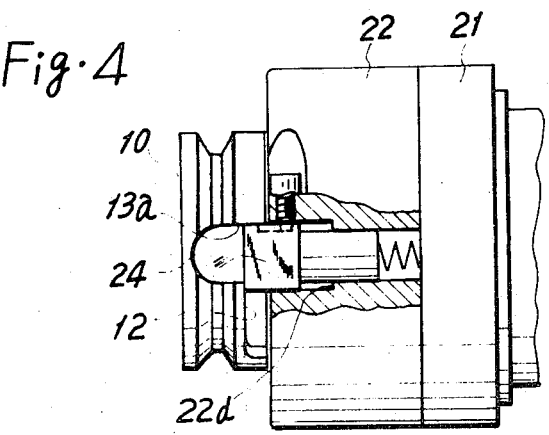

Consequently, the tool holder 10 is extracted from the tapered socket 22a by the axial movement of the tool transfer device, and then, a fresh tool holder 10 is placed in alignment with the axis of the spindle 21 by the rotational movement of the tool transfer device, and thereafter is admitted into the tapered socket 22a by the axial movement thereof. The inserting movement of the tool holder 10 is, however, stopped temporarily in proximity with the position in which the right side of the flange portion 15 is engaged with the front end of the positioning pin 24. At this time, the positioning pin 24 is being urged toward the left by the compressed force of the spring 25, as shown in FIG. 3. Subsequently, the positioning pin 24 is dropped into the arcuate recess 12 by the urging force of the spring 25, since the spindle 21 is being rotatably moved at a constant low speed in a counter-clockwise direction, as seen in FIG. 2. Finally, upon further spindle rotation, the square head portion 24a of the positioning pin 24 comes into contact with the abutment surface 13a, as shown in FIG. 4.

Thus, the engagement between the square head portion 24a and the abutment surface 13a is assured by the operation of the pressure switch 35. In this state, the fixed key 23 and the key-way 11 are not engaged with each other, but the orientation therebetween is completely made. By the engagement-confirming signal of the pressure switch 35, the tool transfer device is further shifted for causing the tool holder 10 to move into the tapered socket 22a, that is, the axial inserting motion for the tool holder 10 is recommenced.

It is to be appreciated that the relative longitudinal movement between the plug 10a and the sleeve 42 is permitted since the sleeve 42 has been moved toward the left, as seen in FIG. 1, by means of the actuating rod 43. When the new tool holder 10 is perfectly fitted to the tapered socket 22a and the actuating rod 43 and the sleeve 42 are moved rightward under the force of spring 44, the balls 41 are again urged toward the groove 16, whereby the balls stick therein, so that the tool holder 10 is locked in the tapered socket 22a. Consequently, the tool holder locked in the tool spindle is applied to perform the desired machining operation on a workpiece.

As the above-mentioned operation is repeated, succeeding diverse tools are inserted into the spindle on the machine tool in a desired required correct key engagement.

Obviously, many modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A device for mounting a working tool on a machine having a spindle head, a tool magazine for removably storing diverse tools, and tool transfer means for transferring the respective diverse tools between said spindle head and said tool magazine, comprising:
 a spindle rotatably mounted within said spindle head, said spindle being provided with a fixed driving key means at one end thereof;
 tool holding means for holding each of said diverse tools;
 engaging means provided on said tool holding means and including an arcuate recess on the peripheral portion of said tool holding means;
 locking means for clamping said tool holding means in said spindle in axial alignment therewith;
 positioning means reciprocably mounted in said one end of said spindle and engageable with one of said engaging means for orienting another of said engaging means to said fixed driving key means in course of the relative rotation between said spindle and said tool holding means before said another of said engaging means is engaged with said fixed driving key means; and
 pushing means arranged in said spindle for urging said positioning means into such a position that said positioning means protrudes a predetermined amount further than said fixed driving key means from said one end of said spindle and for entering said positioning means into said arcuate recess before said another of said engaging means is oriented to said fixed driving key means.

2. A device for mounting a tool on a machine according to claim 1, wherein said engaging means includes a flange portion provided on said tool holding means, said flange portion comprising:
 a key-way disposed on the periphery of said flange portion for engaging said fixed driving key means so that the driving force of said spindle may be transmitted thereto;
 a groove diametrically opposite to said key way on said flange portion and having an abutment surface therein; and
 said arcuate recess extending circumferentially through a predetermined distance from said groove for receiving said positioning means therein and for guiding said positioning means to said abutment surface in accordance with the rotation of said spindle.

3. A device for mounting a tool on a machine according to claim 2, in which said positioning means comprises:
 a positioning pin slidably provided in said spindle at said one end thereof, a head portion on said positioning pin which is greater in width than said key-way and is engageable with said abutment surface of said groove after being received in said arcuate recess for orienting said key-way to said fixed driving key means while said spindle is rotated at a constant low speed; and
 an interior chamber in said positioning pin which is connected to a detecting means for confirming the engagement between said abutment surface and said head portion.

4. A device for mounting a tool on a machine according to claim 3, wherein said detecting means comprises;

a passage for leading pressurized fluid to said interior chamber in said positioning pin;
 a pressure switch for generating a signal in response to the increased pressure in said passage upon engagement of said abutment surface and said head portion for causing said tool holding means to be inserted fully into said spindle.

5. A device for mounting a tool on a machine according to claim 1, wherein said pushing means comprises spring means interposed between said spindle and said positioning means.

6. A device for mounting a tool on a machine according to claim 1, wherein said locking means comprises:

a cylindrical member in said spindle having a forward bore and a rearward bore, said forward bore being of greater diameter than said rearward bore;
a sleeve movably disposed axially within said cylindrical member;
radial apertures in said sleeve spaced circumferentially about a plane transverse to the axis thereof;
balls positioned in said apertures and radially displaceable by engagement with said forward and rearward bores for locking said tool holding means in said spindle upon movement of said sleeve rearwardly to radially displace said balls inwardly against said tool holding means and for releasing said tool holding means by moving said sleeve forwardly to permit displacement of said balls radially outwardly into engagement with said forward bore.

* * * * *